United States Patent
Boice et al.

(10) Patent No.: US 6,823,013 B1
(45) Date of Patent: Nov. 23, 2004

(54) MULTIPLE ENCODER ARCHITECTURE FOR EXTENDED SEARCH

(75) Inventors: Charles E. Boice, Endicott, NY (US); John A. Murdock, Apalachin, NY (US); Agnes Y. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 09/046,289

(22) Filed: Mar. 23, 1998

(51) Int. Cl.[7] .................................................. H04B 1/66
(52) U.S. Cl. .................................................. 375/240.17
(58) Field of Search .......................... 375/240, 240.01, 375/240.16, 240.17, 240.23, 265; 348/409, 415, 416, 699; 382/236, 239, 234; H04B 1/66

(56) References Cited

U.S. PATENT DOCUMENTS

| | | | | |
|---|---|---|---|---|
| 5,259,040 A | * | 11/1993 | Hanna | 382/41 |
| 5,495,555 A | * | 2/1996 | Swaminathan | 395/2.16 |
| 5,680,181 A | * | 10/1997 | Tayama | 348/699 |
| 5,715,016 A | * | 2/1998 | Kobayashi et al. | 348/699 |
| 5,748,247 A | * | 5/1998 | Hu | 348/413.1 |
| 6,011,870 A | * | 1/2000 | Jeng et al. | 382/236 |
| 6,020,934 A | * | 2/2000 | Greenfield et al. | 348/699 |
| 6,044,116 A | * | 3/2000 | Wang | 375/265 |
| 6,104,757 A | * | 8/2000 | Rhee | 375/240 |

* cited by examiner

*Primary Examiner*—Tung T. Vo
(74) *Attorney, Agent, or Firm*—Scully, Scott, Murphy & Presser; William H. Steinberg, Esq.

(57) ABSTRACT

An apparatus used for video encoding MPEG compliant digital visual images, having multiple MPEG encoders used in the motion estimation function. The search capabilities used in the motion estimation function of a single MPEG encoder are extended beyond its design limitations as a result of utilizing more than one MPEG encoder. The utilization of multiple encoders effectively creates the capability for a user to specify a wider search window than what is available in a single encoder configuration. The computational search efficency associated with searching the wider window is not adversely affected as a consequence of the multiple processors subdividing the extended window and analyzing each subdivision in parallel.

20 Claims, 4 Drawing Sheets

MULTIPLE ENCODER ARCHITECTURE FOR EXTENDED SEARCH

BACKGROUND OF THE INVENTION

1. Field of the Invention

The present invention relates generally relates to compression of digital visual images, and more particularly to an architecture for real-time encoding of a video sequence.

2. Discussion of the Prior Art

Within the past decade, the advent of world-wide electronic communications systems has enhanced the way in which people can send and receive information. In particular, the capabilities of real-time video and audio systems have greatly improved in recent years. In order to provide services such as video-on-demand an video conferencing to subscribers, an enormous amount of network bandwidth is required. In fact, network bandwith is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time. One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation. Motion estimation covers a set of techniques used to extract the motion information from a video sequence. The process of motion estimation effectively reduces the temporal redundancy in successive video frames by exploiting the temporal correlation (similarities) that often exists between successive frames. The MPEG syntax specifies how to represent the motion information: one or two motion vectors per 16×16 sub-block of the frame depending on the type of motion compensation: forward predicted, backward predicted, average. The MPEG draft, however, does not specify how such vectors are to be computed. Because of the block-based motion representation block-matching techniques are likely to be used. Block matching generally involves determining the direction of translatory motion of the blocks of pixels from one frame to the next by computing a motion vector. The motion vector is obtained by minimizing a cost function measuring the mismatch between a block in a current frame and multiple predictor candidates (16×16 pixel blocks) from one or more reference frames. The predictor candidates are contained within a user specified search window in the reference video frame. The extent of the search window and the cost function are left entirely to the implementation. Exhaustive searches where all the possible motion vectors are considered, are known to give good results, but at the expense of a very large complexity for large ranges. Ignoring large search ranges, however, can significantly degrade the end result of the search in certain situations. Consider fast moving objects such as race car sequences where the transitory motion (displacement) of the objects from frame to frame is large. Block matching techniques using conventionally sized search windows would fail to capture the object in a reference frame because the objects displacement would place it outside the bounds of the search window in the reference frame. Block matching would yield an inferior motion vector in such a case.

A second situation in which the restrictions of a conventionally sized search window become apparent is that of encoding NTSC format video frames to HDTV format. In this case, the video frames of the HDTV format are extended by a factor of two in both the horizontal and vertical dimensions. The search window size, however, is fixed and as a consequence certain objects would necessarily fall outside the window in an HDTV reference frame as a result of the dimensionality differences. Therefore, there exists a need for an expanded search window, which does not require an inordinate amount of processing time to cover a larger search area in a reference frame thereby yielding more optimal motion vector results.

SUMMARY OF THE INVENTION

It is therefore an object of the present invention to provide an apparatus which will expand the size of the search window utilized in the motion estimation function of a full function MPEG encoder beyond its design limitations through the use of multiple identical encoders.

It is another object of the present invention to minimize the number of Input/Output ports required to support the apparatus.

It is yet another object of the present invention to minimize the power consumption associated with the apparatus.

It is still a further object of the present invention to maximize the transparency of the additional functional units required to support the apparatus.

In order to attain the above objects, according to the present invention, there is provided an apparatus which utilizes multiple identical MPEG semiconductor IC encoders (hereinafter encoder) coupled in a series configuration.

In one aspect of the present invention the search window is extended in the horizontal or vertical direction by using two MPEG encoders coupled in series.

In a further aspect of the present invention, the search window is extended in both the horizontal and vertical directions by using four MPEG encoders coupled in series.

The allowable encoder configurations are one encoder, two encoders for extended horizontal searching, two encoders for extended vertical searching, and four encoders for extended horizontal and vertical searching. For each multiple encoder configuration (e.g. 2 or 4 encoders in series) one encoder will be designated as a master encoder, with binary address 001, and satisfies all of the functionality required in a conventional single encoder configuration. Each additional encoder is referred to as a slave encoder and is separately identifiable via a three bit binary address. The binary address is required when the extended search window is subdivided in the multiple encoder configuration and each subdivision must be allocated to the proper encoder for analysis.

In a typical operation a user would define, via file creation or similar means, 1) a search window size (e.g. by defining a horizontal and vertical pixel width), and 2) the number of encoders to use. When either a horizontal or vertical window extension is requested, beyond the extendible bounds of a single encoder configuration, two encoders are required to satisfy the request. Extending the window in both directions simultaneously requires four encoders.

Regardless of which dimension or degree of extension is desired by a user, all searches are performed in parallel in the multiple encoder configurations by dividing the expanded search window in proportion to the number of encoders in use. As a result, overall encoder performance is not affected by searching a much larger search window. In addition, the utilization of multiple encoders remains transparent to all units on both the master encoder and the slave encoder(s).

The various features of novelty which characterize the invention are pointed out with particularity in the claims annexed to and forming a part of the disclosure. For a better understanding of the invention, its operating advantages, and specific objects attained by its use, reference should be made to the drawings and descriptive matter of which there are illustrated and described preferred embodiments of the invention.

BRIEF DESCRIPTION OF THE DRAWINGS

Reference may now be had to the following detailed description of preferred embodiments of the invention, taken in conjunction with the accompanying drawings in which.

DETAILED DESCRIPTION OF THE PREFERRED EMBODIMENTS OF THE INVENTION

Figure 1:
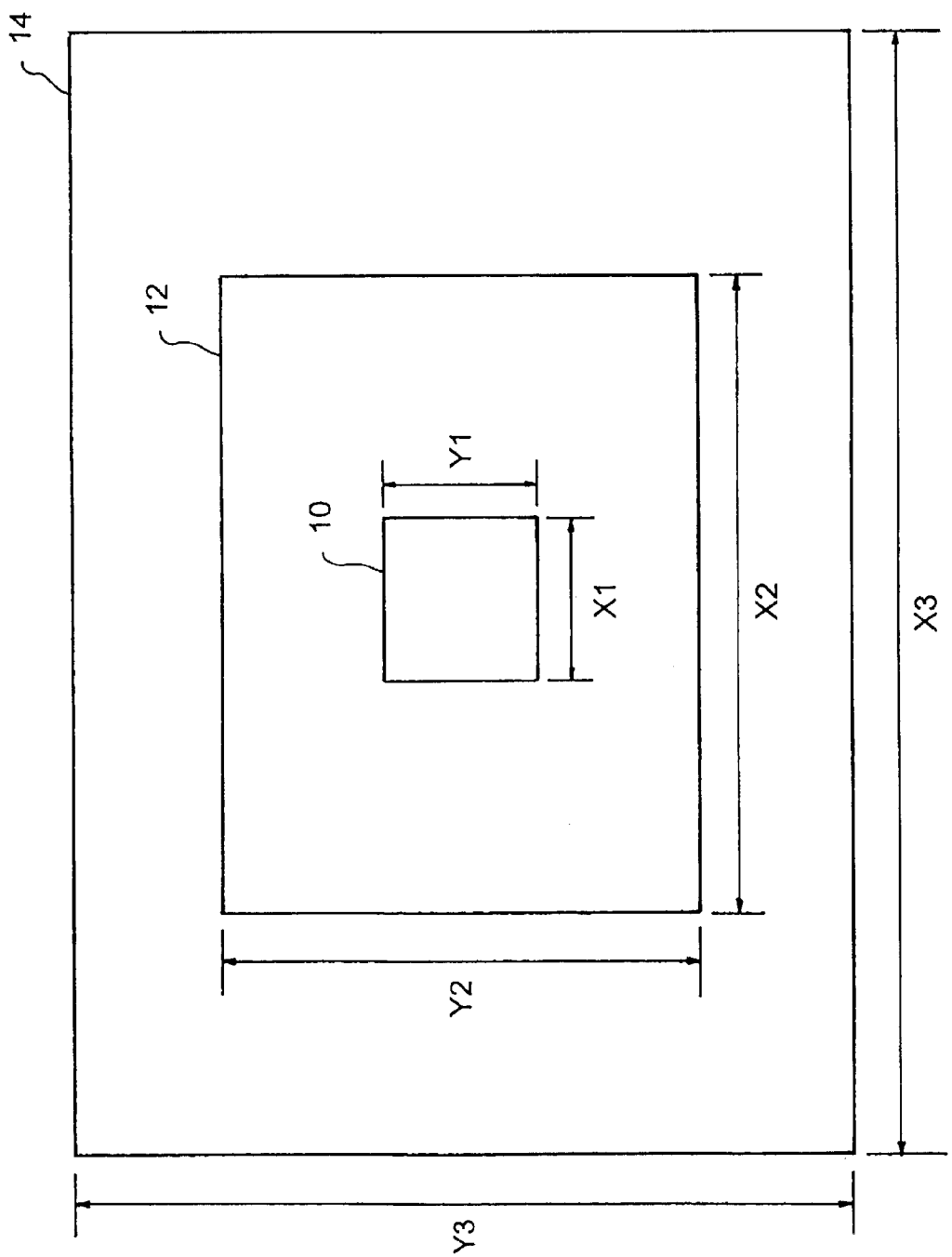
FIG. 1 is an illustration of the dimensions of a search window size of a single and multiple encoder configuration.

FIG. 1 illustrates how a search window of a full-function MPEG encoder may be further extended in both the horizontal and vertical dimensions beyond its design limitations by the apparatus of the present invention. The single encoder configuration provides a search window 10 of minimum dimension (X1 by Y1), and a search window 12 of maximum dimension (X2 by Y2) in the horizontal and vertical directions respectively, where all dimensions are in pixels. The present invention provides the capability of extending the bounds of the maximum search window 12 of the single encoder configuration beyond its design limitations through the use of multiple identical encoders. That is, the bounds of the maximum search window 12 may be further extended to a window 14 of extended maximum dimension (X3 by Y3) in the horizontal and vertical dimensions, respectively. Extensions in each direction are specified by a single integer which define both a positive and negative increment from the window center position. In an illustrative embodiment, the following Table defines the available search window extensions, for the particular encoder configurations

TABLE

| | | SEARCH WINDOW | |
|---|---|---|---|
| Extension Direction and Extent | Number of Encoders | min window plus Max horizontal extension (in pixels) | min window plus Max vertical extension (in pixels) |
| 1x (horizontal and vertical) | 1 (as designed) | 16 +/− 96 | 16 +/− 64 |

TABLE-continued

| | | SEARCH WINDOW | |
|---|---|---|---|
| Extension Direction and Extent | Number of Encoders | min window plus Max horizontal extension (in pixels) | min window plus Max vertical extension (in pixels) |
| 2x horizontal | 2 | 16 +/− 192 | 16 +/− 64 |
| 2x vertical | 2 | 16 +/− 96 | 16 +/− 128 |
| 2x (hor and vert) | 4 | 16 +−/ 192 | 16 +/− 128 |

Figure 2:
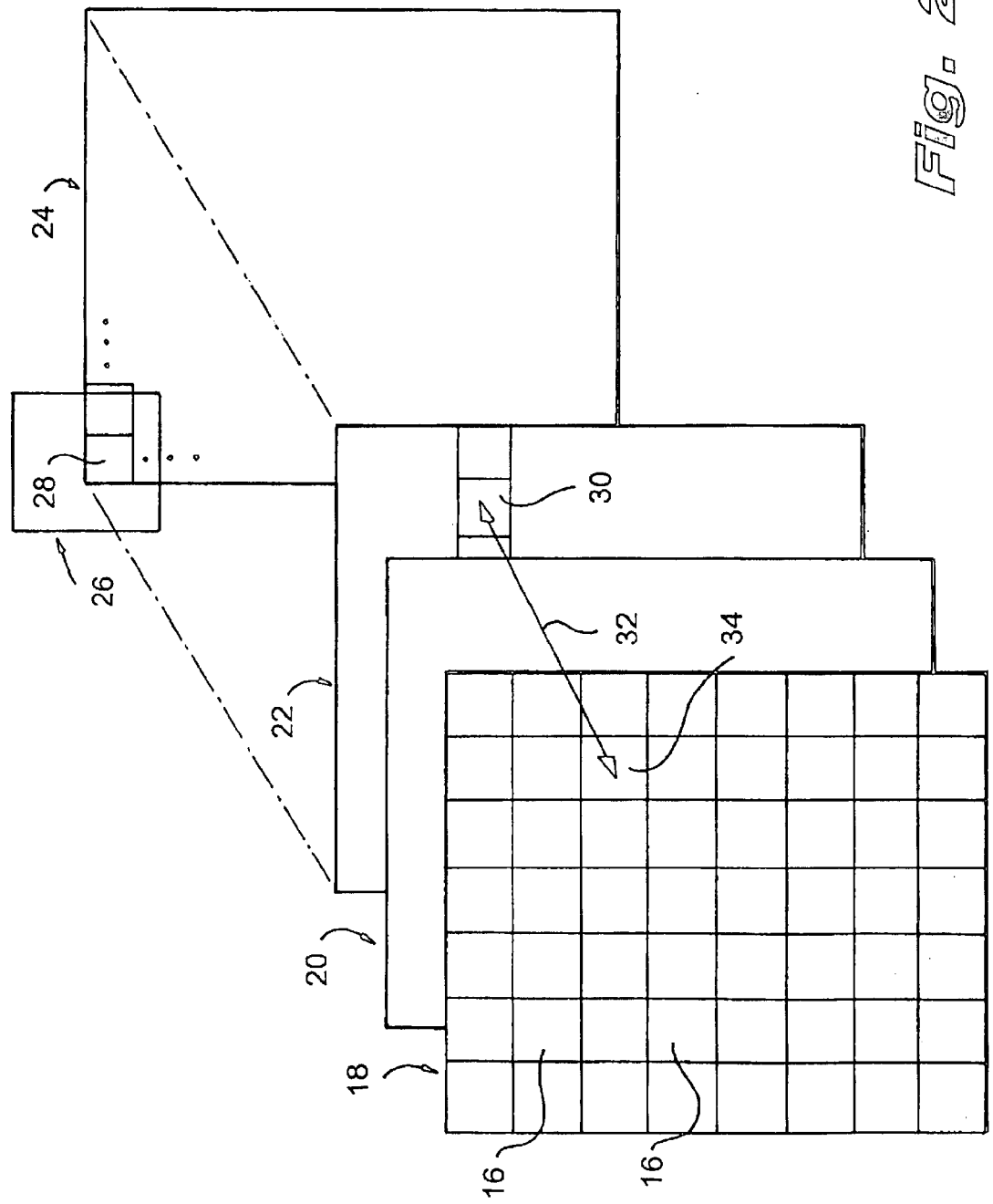
FIG. 2 is an illustration of a partial series of digital video frames, wherein encoding will be performed for each frame in the series.

Referring now to FIG. 2, a partial series of video frames is shown 18, 20, 22, and 24 to illustrate how a search window is utilized in the block matching algorithm to find a "best match" macroblock from which an optimal motion vector is computed. As mentioned previously, block matching is a particular motion estimation technique used to extract motion information from a video sequence. The technique operates by conducting a search from a macroblock in a current frame throughout a region of a reference frame to find a best match macroblock. The reference frame is selected to be either a past, future or both a past and future frame depending upon the picture type (i.e. I,P, or B) being encoded. The selection of an appropriate reference frame is picture type dependent and well known in the art.

The particular region searched in the reference frame is defined by a search window created in the reference frame, whose size is user defined, and where each unique 16×16 pixel combination, macroblock, inside the window is considered as a potential best match macroblock.

In general, video frames are divided into grids of macroblocks 16, (e.g. 16×16 pixel blocks), as illustrated by frame 18. Each frame in the video sequence is one of three types "Intra frames" or "I" frames, "Predicted pictures" or "P" frames, and "Bidirectional frames" or "B" frames. By example, consider frame 22 of FIG. 2 as a P picture to be encoded. The frame in which the macroblock is currently being encoded is designated as the current frame. In this example frame 22 would therefore constitute a current video frame. The block matching algorithm encodes each macroblock in the current frame in turn. This example focuses on encoding one particular macroblock 30 as representative of the encoding process. Given that frame 22 is a P picture type the block matching algorithm would select the most recent past I or P picture as a reference frame. Consider frame 18 to be the most recent past I or P picture as the reference frame.

A best match to macroblock 30 in the current frame 22 would be found by centering the search window over the macroblock 34 in the reference frame 18 whose coordinates match those of macroblock 30 in the current frame. The process of positioning the window at the appropriate coordinates in the reference frame is illustrated by the bidirectional arrow 32. In those situations where the macroblock to be encoded is near the edge of a frame 28 the window 26 will simply extend beyond the frame boundaries and no searching is required for that portion of the window which extends outside the frame.

Figure 3:
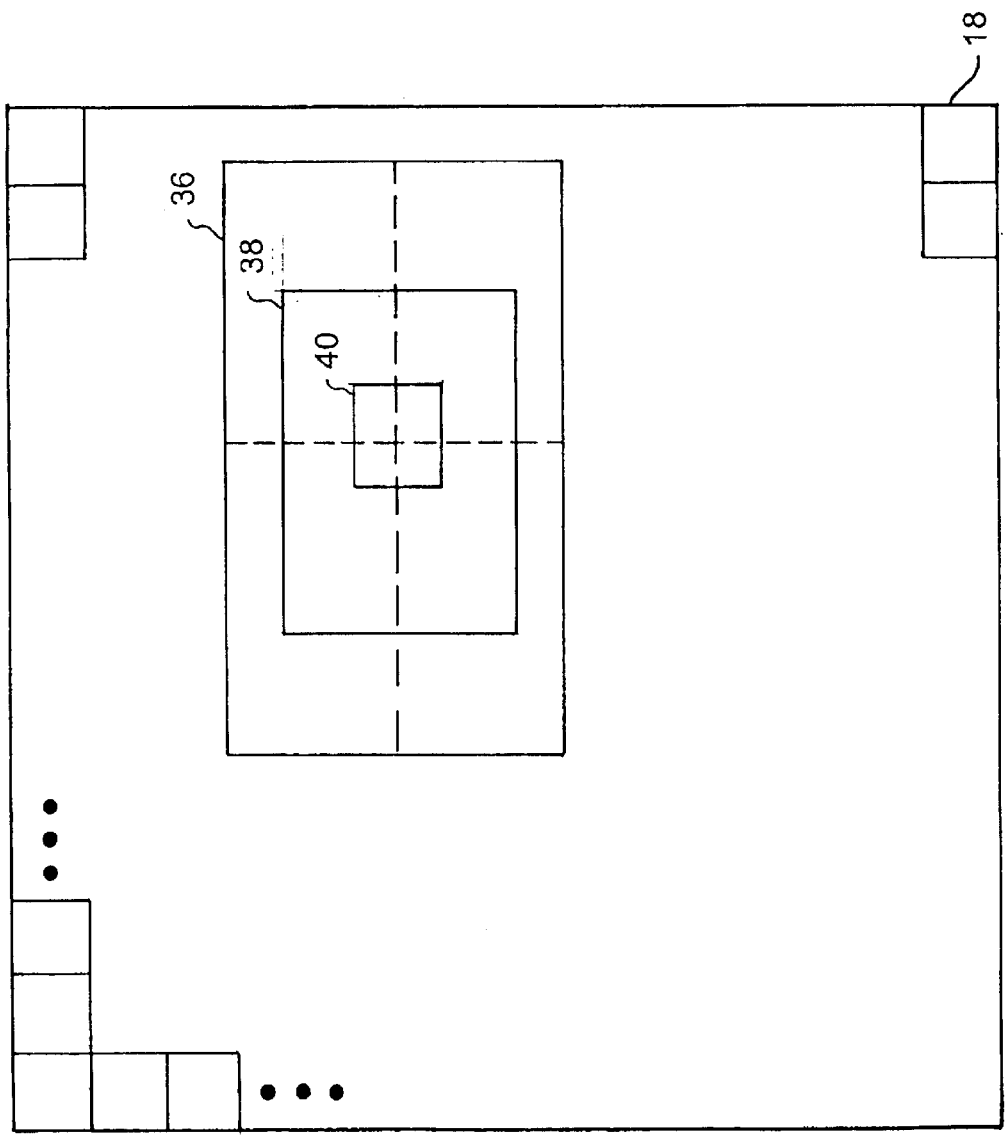
FIG. 3 is an illustration of a reference frame containing two search windows: the window of a single encoder configuration and the window of a multiple encoder configuration.

Referring now to FIG. 3, two search windows 36 and 38 are illustrated centered about the reference macroblock 42. The single encoder configuration window 38 is illustrated along with an extended search window 36 of the multiple encoder configuration. The extended window is shown as being extended in both the horizontal and vertical directions.

The process of searching for a best match involves analyzing each unique 16×16 rectangular grid of pixels contained within the bounds of the search window in the reference frame. By example, an 80×80 search window would contain 4225 unique 16×16 pixel grids. Each grid contained in the window is analyzed in raster scan order by starting in the upper leftmost corner of the window, obtaining a search result, and moving one pixel row to the right to obtain a second search result. The process is repeated in successive rows in the window. At each grid position in the search window a computation or search result is performed which involves summing the absolute difference between the luminance pixel values in the macroblock currently being encoded, macroblock 30 in frame 22 in the present example, and the corresponding luminance pixel values of the 16×16 pixel grid currently being analyzed. There is a one to one correspondence between the number of unique 16×16 grids contained within the search window and the number of search results computed. It is apparent that utilizing an extended window 36 affords a greater number of search results as a consequence of the extended window covering additional pixel grids. The probability of obtaining a more optimal best match motion vector is enhanced as a result.

Figure 4:
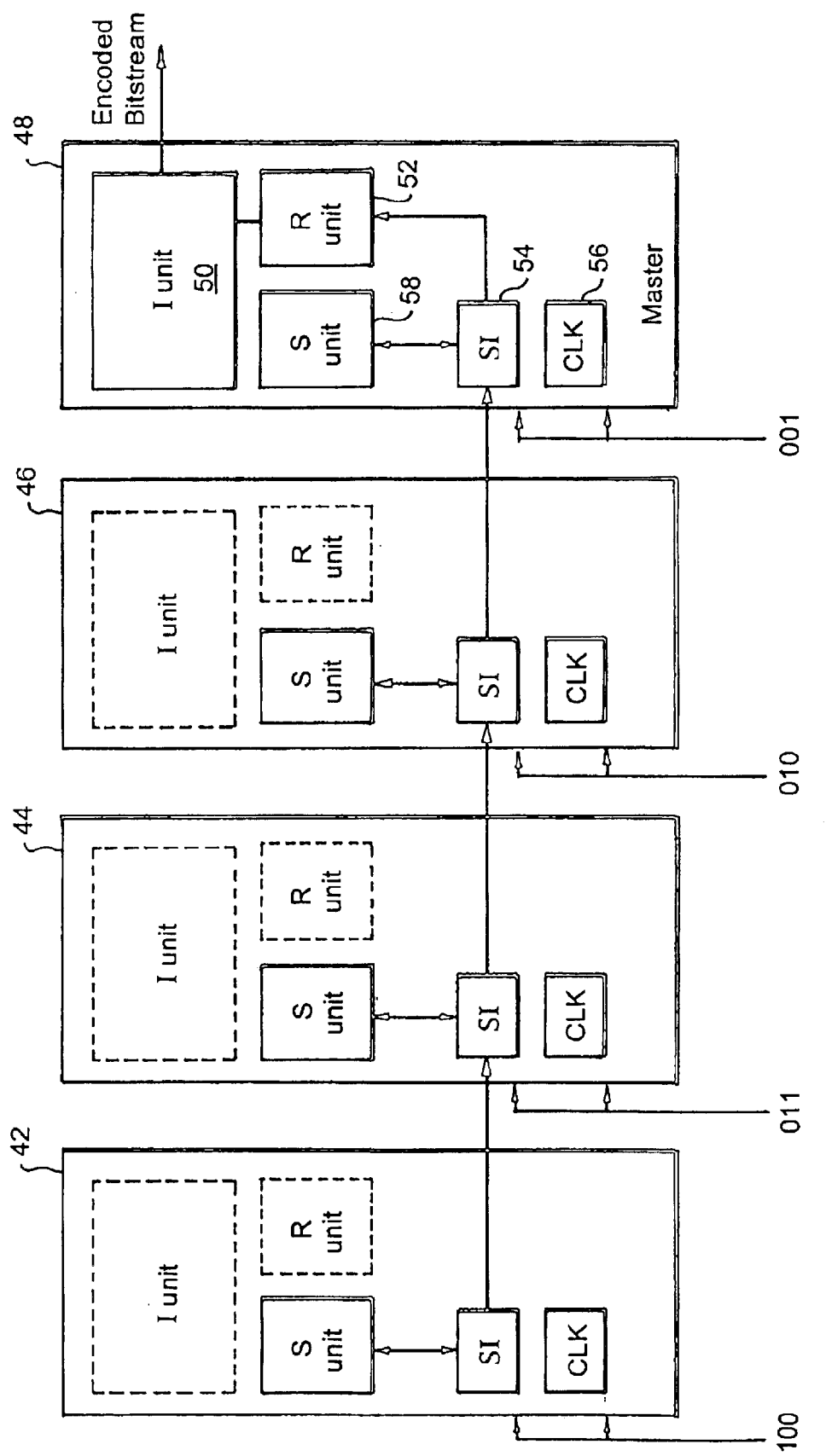
FIG. 4 is an illustration of a four encoder hardware configuration.

FIG. 4 is a block diagram of an exemplary embodiment of a four encoder configuration. The diagram describes four series coupled encoders where the coupling is effected by sourcing the output data from each search interface as input data to the unit to its immediate right. This four encoder configuration permits user definable search window extensions in the horizontal and vertical directions simultaneously. Extensions in a single direction are achieved with a two encoder configuration by enabling only encoders 46 and 48. The encoders are configured in series in increasing address order with the master encoder 48 being first in the series with associated binary address 001. The three remaining slave encoders are associated with successively higher binary addresses: encoder 46—address 010, encoder 44—address 011, and encoder 42—address 100. The identification is made by hardwiring a three pin input on the encoder to a voltage level corresponding to the appropriate binary address.

Each encoder is shown as being comprised of the following functional units; 1) an intra unit 50, a search unit 58, a search interface Unit 54, a refine unit 52, and a clock unit 56. The intra unit 50 provides the functionality of a base encoder, the search unit 58 provides a coarse search to be used in the motion estimation process, and the refine unit 52 provides a refined search around the search results from the search unit. The master encoder 48 operates like a stand alone encoder with all functional units operating in normal fashion. By contrast, the only functional units made operational on the slave encoders are the search unit, search interface unit, and the clock unit. The intra and refine units are turned off in the slave encoders in order to minimize power consumption. Logic contained within the clock unit recognizes the encoder's binary address as belonging to a slave encoder and turns off power to the intra, refine, and clock units in response. The slave encoders are utilized in the apparatus of the present invention strictly for their searching capabilities. Each search unit is responsible for searching a prescribed subdivision of the extended search window. The search interface 54 unit in each encoder partitions the extended search window and directs the search unit 22 to search a designated subdivision of the window as determined by decoding the encoder's binary address. For the four encoder embodiment the search window would be apportioned in four quadrants; a top, left and right quadrant, and a bottom, left and right quadrant, with one encoder having responsibility for searching a particular quadrant. To ensure that the entire window is searched all subdivision search windows overlap by a macroblock. For a two encoder configuration the extended search window is divided in half with one encoder responsible for searching each half.

The search interface 54 in each encoder is provided to compare the "best match" search result obtained by the associated search unit with the "best match" search result from the preceding encoder unit in the series configuration for the purpose of selecting the overall best result. In all multiple configurations, search results per macroblock are chained back through the multiple encoders in decreasing binary address order. Referring to FIG. 4, for example, results from encoder 42 with binary address 100 would be chained back to encoder 44 with binary address 011 whose results would be chained back in turn to encoder 46 with Binary address 010, which in turn would chain back its results to encoder 48 with binary address 001. The search interface 54 unit in each encoder compares its own search results to those of the previous encoder in the chain and passes along the best of the two. After the search interface unit on the master encoder 48 makes its compare and selects the best results, where the final result represents the best combined result of all the encoders, it passes them on to the refine unit 52 just as it would on a single encoder. Since the refine unit 52 associated with the master encoder sees only a single final search result from the search interface 54 on the master encoder 48, the fact that multiple encoders were used to perform the search remains transparent to the refine unit, and other functional; units on the master encoder.

To accomodate the setup of initialization parameters to the slave encoder, such as search window size, input I/O ports and output I/O ports are required. In order to minimize the total number of I/O ports needed per encoder chip, the I/O ports are bi-directional so that only one set of I/O ports are required instead of two. When the encoders are wired together, these bi-directional buses on the master encoder are wired directly to the corresponding I/O ports on the slave encoders. The master encoder always drives the bi-directional buses knowing it is a master encoder from its decode of 001. The slave encoders always place these I/O ports in receive mode knowing that they are slave from their respective decodes.

Having thus described our invention, what we claim as new, and desire to secure by Letters Patent is:

1. Apparatus for expanding the size of a search window of a motion estimator when encoding a sequence of digitized video frames, comprising:

one or more chip encoders, wherein the number of encoders is selected and defined by a user based upon the expanded size of the search window;

wherein each encoder comprises, a search unit to provide a coarse search to be used in the motion estimation process, a search interface unit for comparing computed search results with search results from other encoders and selecting the best result, an intra unit for providing a base encoder function, a search refine unit to provide a refined search around the search results from the search unit, and a clock unit;

wherein the intra unit and the search refine unit can be made inoperable by control logic in the clock unit.

2. The apparatus of claim 1, comprising:

a first encoder for providing a search window of a first size;

a second encoder, coupled to the search interface unit of the first encoder, for expanding the size of the window to a second size.

3. The apparatus of claim 2, further comprising:
a third encoder and a fourth encoder for expanding the size of the window to a third size, wherein the third encoder is coupled to the search interface unit of the second encoder, and the fourth encoder is coupled to the search interface unit of the third encoder.

4. The apparatus of claim 3, wherein each encoder has a unique binary address, and the search interface unit for the third and fourth encoders searches a designated subdivision of the search window as determined by a decode of the encoder binary address.

5. The apparatus of claim 4, wherein the designated subdivision searched is one-quarter of the search window in a four encoder configuration.

6. The apparatus of claim 5, wherein the search interface unit compares computed search results with search results from the encoder whose binary address is one greater, and saves only the lesser result for future comparison.

7. The apparatus of claim 3, wherein each of the first, second, third and fourth encoders has a unique binary address.

8. The apparatus of claim 7, wherein the binary address assigned to the second, third, and fourth encoders is greater than that assigned to the first encoder.

9. The apparatus of claim 1, where the size of the search window is expanded in both the vertical and horizontal directions.

10. The apparatus of claim 1, wherein each encoder has a unique binary address, and is connected in series in order of increasing binary address.

11. The apparatus of claim 1, where the size of the search window is expanded in the horizontal direction.

12. The apparatus of claim 1, where the size of the search window is expanded in the vertical direction.

13. The apparatus according to claim 2, wherein each encoder has a unique binary address, and the search interface unit for the first and second encoders searches a designated subdivision of the search window as determined by a decode of the encoder binary address.

14. The apparatus of claim 13, wherein the designated subdivision searched is one-half of the search window in a two encoder configuration.

15. The apparatus according to claim 1, wherein each encoder has a unique binary address, and the search interface unit compares computed search results with search results from the encoder whose binary address is one greater, and saves only the lesser result for future comparison.

16. The apparatus of claim 2, wherein each of the first and second encodes has a unique binary address.

17. The apparatus of claim 1, wherein each encoder has a unique binary address, and the lowest binary address is always assigned to the first encoder.

18. The apparatus of claim 1, wherein each encoder has a unique binary address, and each encoder is connected in series in order of increasing binary address.

19. The apparatus of claim 1, wherein the maximum expansion in a vertical dimension is made twice the width of the vertical dimension of a first size window.

20. The apparatus of claim 1, wherein the maximum expansion of the search window in a horizontal dimension is twice the width of the horizontal dimension of the first size window.

* * * * *